(12) United States Patent
Kim et al.

(10) Patent No.: US 11,901,584 B2
(45) Date of Patent: Feb. 13, 2024

(54) CONNECTION STRUCTURE OF TERMINAL FOR BATTERY

(71) Applicant: SUNGWOO HITECH CO., LTD., Busan (KR)

(72) Inventors: Tae Hee Kim, Busan (KR); Sung Man Sohn, Yangsan-si (KR)

(73) Assignee: SUNGWOO HITECH CO., LTD., Busan (KR)

( * ) Notice: Subject to any disclaimer, the term of this patent is extended or adjusted under 35 U.S.C. 154(b) by 195 days.

(21) Appl. No.: 17/475,396

(22) Filed: Sep. 15, 2021

(65) Prior Publication Data

US 2022/0149485 A1    May 12, 2022

(30) Foreign Application Priority Data

Nov. 12, 2020  (KR) .................. 10-2020-0151200

(51) Int. Cl.
| | |
|---|---|
| *H01M 50/507* | (2021.01) |
| *H01M 50/517* | (2021.01) |
| *H01R 4/34* | (2006.01) |
| *H01R 25/16* | (2006.01) |

(52) U.S. Cl.
CPC ....... *H01M 50/507* (2021.01); *H01M 50/517* (2021.01); *H01R 4/34* (2013.01); *H01R 25/162* (2013.01)

(58) Field of Classification Search
CPC ..... H01R 4/34; H01R 25/162; H01M 50/507; H01M 50/517; H01M 50/514; H01M 50/516; H01M 50/502
See application file for complete search history.

(56) References Cited

U.S. PATENT DOCUMENTS

| | | | | |
|---|---|---|---|---|
| 10,062,977 | B2 * | 8/2018 | Fees | H01M 50/514 |
| 10,749,161 | B2 * | 8/2020 | Huff | H01M 10/482 |
| 2003/0190522 | A1 | 10/2003 | Ogata | |

(Continued)

FOREIGN PATENT DOCUMENTS

| | | |
|---|---|---|
| CN | 202178406 | 3/2012 |
| CN | 203690368 | 7/2014 |

(Continued)

OTHER PUBLICATIONS

EPO, European Search Report of EP 21202664.5 dated Apr. 8, 2022.
SIPO, Office Action of CN 202111333181.6 dated Aug. 15, 2023.

*Primary Examiner* — Oscar C Jimenez
*Assistant Examiner* — Paul D Baillargeon
(74) *Attorney, Agent, or Firm* — LEX IP MEISTER, PLLC (57) ABSTRACT

A terminal connection structure of a battery is disclosed. A terminal connection structure of the battery is for electrically connecting positive and negative terminals of battery modules of a first row and battery modules of a second row that is adjacent to the first row in a plurality of rows where battery modules are arranged. The terminal connection structure of the battery may include: a first bus bar module electrically connecting the positive and negative terminals in the first row of battery modules; and a second bus bar module configured to electrically connected to the positive and negative terminals in the battery modules of the second row, stacked vertically on the first bus bar module, to be electrically connected to the first bus bar module.

8 Claims, 6 Drawing Sheets

(56) References Cited

U.S. PATENT DOCUMENTS

| | | | |
|---|---|---|---|
| 2008/0097008 A2* | 4/2008 | Yamada | .................. C08L 67/04 |
| | | | 524/437 |
| 2008/0131761 A1 | 6/2008 | Liu et al. | |
| 2011/0159350 A1 | 6/2011 | Ochi | |
| 2014/0255748 A1 | 9/2014 | Jan et al. | |
| 2014/0255750 A1 | 9/2014 | Jan et al. | |
| 2016/0197332 A1 | 7/2016 | Lee et al. | |
| 2017/0062789 A1 | 3/2017 | Sim et al. | |
| 2018/0109016 A1 | 4/2018 | Fees et al. | |
| 2019/0173134 A1 | 6/2019 | Lee et al. | |
| 2022/0021082 A1* | 1/2022 | Chen | ................... H01M 50/507 |

FOREIGN PATENT DOCUMENTS

| | | |
|---|---|---|
| CN | 108376755 | 8/2018 |
| CN | 109192913 | 1/2019 |
| CN | 111477830 | 7/2020 |
| JP | 2013-196932 | 9/2013 |
| JP | 2016-516273 | 6/2016 |
| KR | 10-2008-0102547 | 11/2008 |
| KR | 10-2018-0068270 | 6/2018 |
| KR | 10-2019-0131246 | 11/2019 |
| KR | 10-2020-0029158 | 3/2020 |
| TW | 201421779 | 6/2014 |

* cited by examiner

CONNECTION STRUCTURE OF TERMINAL FOR BATTERY

CROSS-REFERENCE TO RELATED APPLICATION

This application claims priority to and benefits of Korean Patent Application No. 10-2020-0151200, filed in the Korean Intellectual Property Office on Nov. 12, 2020, the entire contents of which are incorporated herein by reference.

BACKGROUND OF THE INVENTION

(a) Field of the Invention

An embodiment of the present invention relates to a battery pack for an electric vehicle, and more particularly, to a terminal connection structure of a battery for electrically connecting electrode terminals of battery modules.

(b) Description of the Related Art

Recently, electric vehicles have been steadily developed due to environmental pollution issues and efforts to develop alternative energy.

An electric vehicle is equipped with an electric motor (drive motor) for driving the vehicle and a high voltage battery for supplying electric power to the electric motor. A high voltage battery, which is an energy source that drives an electric motor, may supply high voltage power to the electric motor through an inverter.

Such a battery is a battery assembly of rechargeable and discharging secondary batteries, and is mounted in a vehicle body in the form of a battery pack including battery modules with a plurality of battery cells accommodated inside a battery case.

The battery modules are electrically connected to battery cells having various shapes, and positive and negative terminals of the battery cells are connected in series through bus bars.

Conventionally, battery modules are arranged in a plurality of rows, and for a first row of battery modules in neighboring rows of battery modules, positive terminals and negative terminals of the battery cells are connected through bus bars, and for a second row of battery modules, positive terminals and negative terminals of the battery cells are connected through bus bars.

Herein, the bus bars connected to the battery modules in the first row and the bus bars connected to the battery modules in the second row are arranged in a horizontal direction to face each other between the rows of battery modules.

However, in the related art, as the positive terminals face each other in the rows of battery modules adjacent to each other, when a thermal runaway phenomenon of the battery occurs, heat may be easily transferred to an adjacent electrode, which may cause accelerated fire and an additional explosion problem.

In addition, in the related art, since a space above the bus bars facing each other in a horizontal direction in a space between the rows of battery modules acts as an unused space, energy density of the entire battery pack may be reduced.

The above information disclosed in this Background section is only for enhancement of understanding of the background of the invention, and therefore it may contain information that does not form the prior art that is already known in this country to a person of ordinary skill in the art.

SUMMARY OF THE INVENTION

Embodiments of the present invention have been made in an effort to provide a terminal connection structure of a battery, capable of reducing an unused space between battery modules arranged adjacent to each other, and preventing occurrence of fire and explosion of the battery.

A terminal connection structure of a battery according to an embodiment of the present invention is for electrically connecting positive and negative terminals of battery modules of a first row and battery modules of a second row that is adjacent to the first row in a plurality of rows where battery modules are arranged.

The terminal connection structure of the battery may include: a first bus bar module configured to electrically connect the positive and negative terminals in the battery modules of the first row; and a second bus bar module configured to electrically connected to the positive and negative terminals in the battery modules of the second row, stacked vertically on the first bus bar module, to be electrically connected to the first bus bar module.

The first bus bar module may include: a first terminal block positioned in an arrangement direction of the battery modules in the battery modules of the first row, to accommodate the positive and negative terminals of the battery modules, and to electrically connect the battery modules; a plurality of first bus bars positioned in the first terminal block to connect the positive and negative terminals of the battery modules adjacent to each other along the arrangement direction; a first fastening bolt configured to fasten the first bus bars and the positive and negative terminals to the first terminal block; and a first cover configured to cover an upper end of the first terminal block.

The second bus bar module may include: a second terminal block positioned in an arrangement direction of the battery modules in the battery modules of the second row, to accommodate the positive and negative terminals of the battery modules, and to electrically connect the battery modules; a plurality of second bus bars positioned on the second terminal block to connect the positive and negative terminals of the battery modules adjacent to each other along the arrangement direction; a second fastening bolt configured to fasten the second bus bars and the positive and negative terminals to the second terminal block; and a second cover configured to cover an upper end of the second terminal block.

Each of the first and second terminal blocks may include: first terminal accommodating portions configured to accommodate the positive and negative terminals, respectively, and formed at opposite ends; and a second terminal accommodating portion configured to simultaneously accommodate the positive and negative terminals of neighboring battery modules, and formed between the opposite ends.

Each of the first and second terminal blocks may open the first and second terminal accommodating portions through an upper end thereof, and may close the first and second terminal accommodating portions through a lower end thereof.

An insulating material may be provided on an inner surface of each of the first and second terminal blocks and a lower surface of each of the first and second covers.

The first and second bus bar modules may be stacked vertically through the first and second terminal blocks.

A first bus bar connected to a positive terminal in a first one of the first terminal accommodating portions of the first terminal block may protrude from the first terminal block in an arrangement direction of the battery modules, and a second bus bar connected to a negative terminal in a first one of the first terminal accommodating portions of the second terminal block may protrude from the second terminal block in an arrangement direction of the battery modules.

The negative terminal accommodated in the other first terminal accommodating portion of the first terminal block and the positive terminal accommodated in the other first terminal accommodating portion of the second terminal block may be coupled to each other through a copper bolt, to be electrically connected.

A terminal connection structure of a battery according to another embodiment of the present invention is for electrically connecting positive and negative terminals of battery modules of a first row and battery modules of a second row that is adjacent to the first row in a plurality of rows where battery modules are arranged. The terminal connection structure of the battery may include: a first bus bar module configured to electrically connect the positive and negative terminals in the battery modules of the first low through a first terminal block and first bus bars; and a second bus bar module configured to electrically connect the positive and negative terminals in the battery modules of the second row through a second terminal block and second bus bars, and the first and second bus bar modules may be stacked vertically through the first and second terminal blocks, and may be electrically connected to each other through the first and second bus bars.

Each of the first and second bus bar modules may further include first and second covers respectively coupled to upper ends of the first and second terminal blocks.

An insulating material made of a mica material may be provided on an inner surface of each of the first and second terminal blocks and a lower surface of each of the first and second covers.

According to an embodiment of the present invention, it is possible to prevent acceleration and explosion of fire when thermal runaway of the battery occurs, and increasing an energy density of the battery pack, by vertically stacking the first and second bus bar modules between the battery modules arranged adjacent to each other.

Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

The drawings are intended to be used as references for describing the embodiments of the present invention, and the accompanying drawings should not be construed as limiting the technical spirit of the present invention.

DETAILED DESCRIPTION OF THE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

In the following description, dividing names of components into first, second, and the like is to divide the names because the names of the components are the same, and an order thereof is not particularly limited.

In the present specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", and " . . . part" described in the specification mean a unit of a comprehensive configuration having at least one function or operation.

Figure 1:
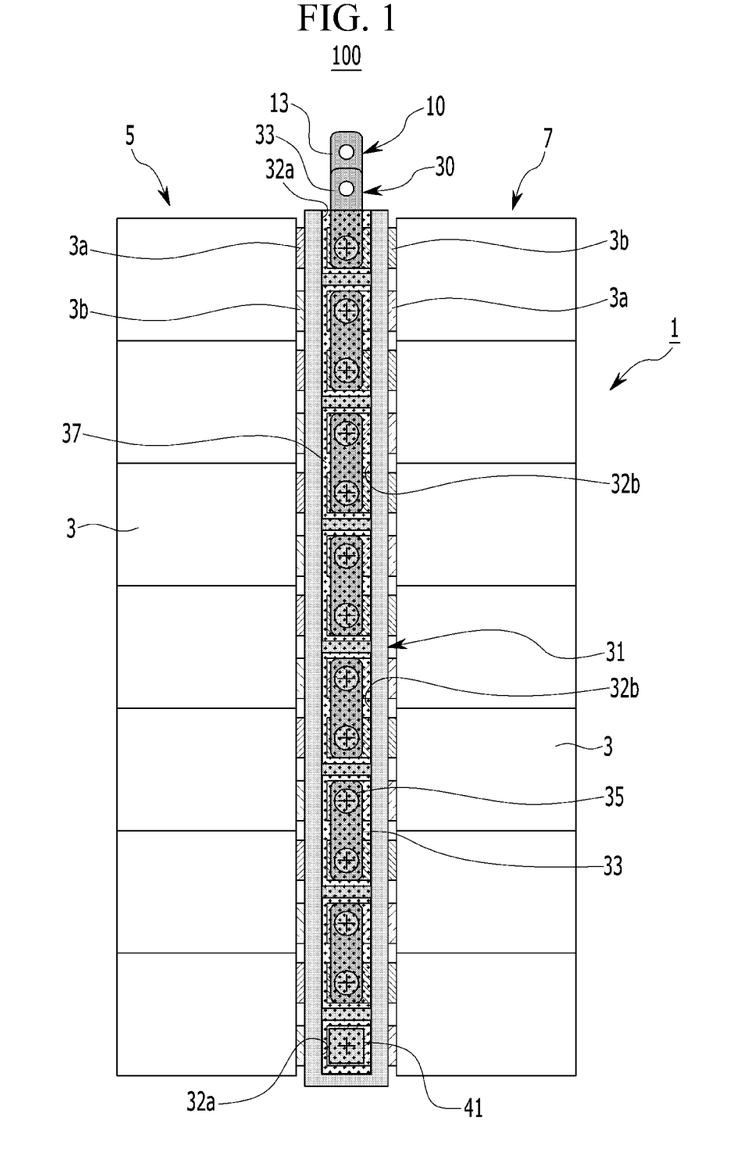
FIG. 1 and FIG. 2 each illustrate a schematic plan diagram showing a terminal connection structure of a battery according to an embodiment of the present invention.
Figure 2:
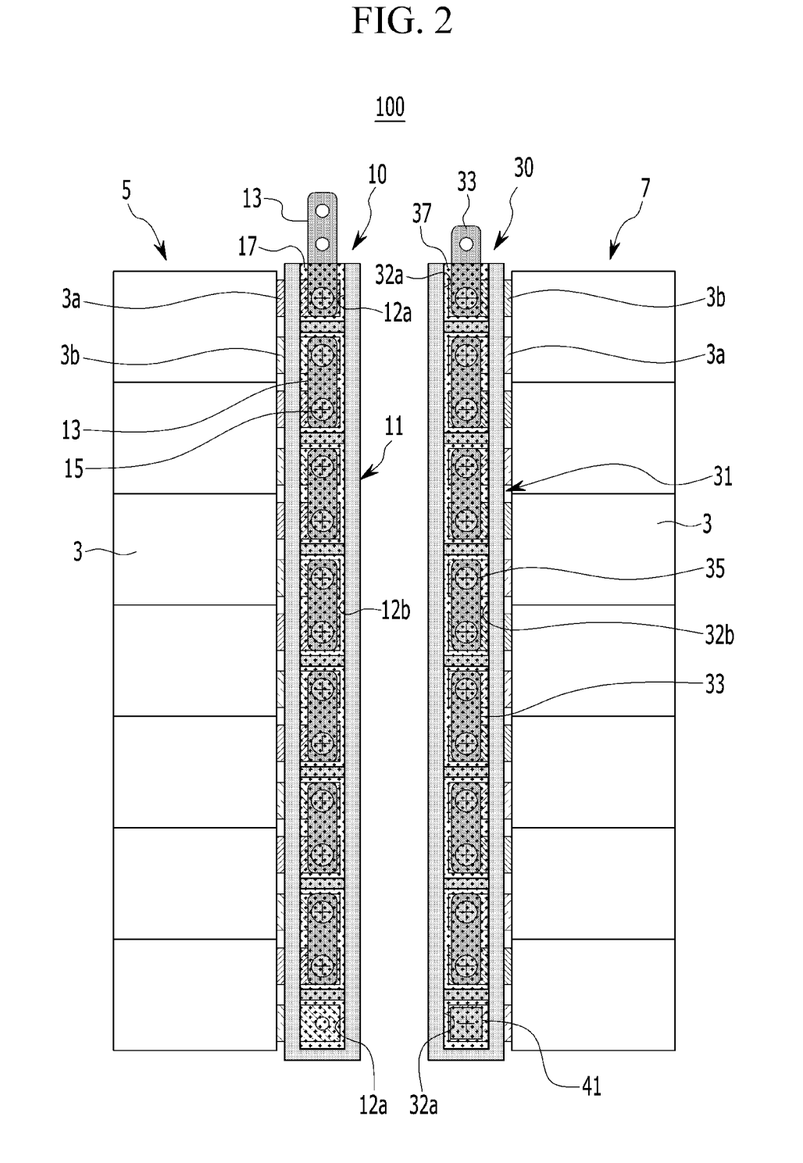
Figure 3:
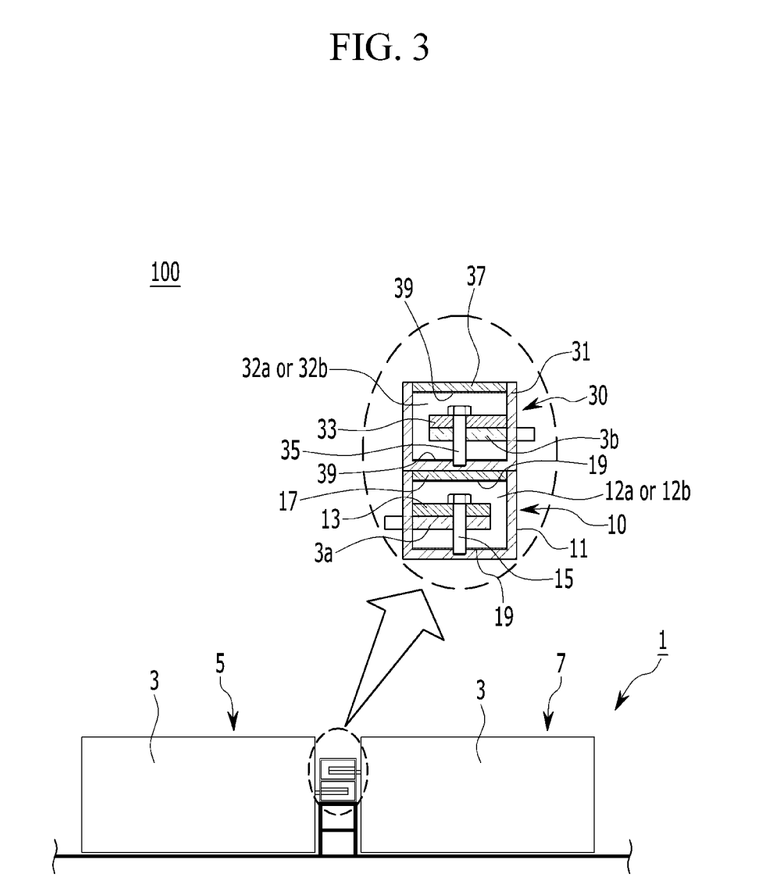
FIG. 3 illustrates a schematic cross-sectional diagram showing a terminal connection structure of a battery according to an embodiment of the present invention.

FIG. 1 and FIG. 2 illustrate a schematic plan diagram showing a terminal connection structure of a battery according to an embodiment of the present invention, and FIG. 3 illustrates a schematic cross-sectional diagram showing a terminal connection structure of a battery according to an embodiment of the present invention.

Referring to FIG. 1 to FIG. 3, the terminal connection structure 100 of the battery according to the embodiment of the present invention may be applied to a battery pack 1 that applies high voltage power to a driving motor in an electric vehicle that is driven by using the driving motor as a power source.

The battery pack 1 for the electric vehicle is mounted in an underbody of a vehicle body, and has a structure in which battery modules 3 capable of charging and/or discharging are accommodated in a battery case.

Each of the battery modules 3 is a battery assembly in which a plurality of battery cells are electrically connected, a number of battery cells may be variously changed depending on a battery capacity, and a number and a shape of the assembly may also be variously changed.

Herein, each of the battery modules 3 include a positive terminal 3a and a negative terminal 3b to which positive and negative electrode leads of battery cells are bonded.

Such battery modules 3 are arranged in a plurality of rows inside the battery case, and hereinafter, any one of the rows will be referred to as a first row 5, and another row adjacent to the first row 5 is referred to as a second row 7.

Hereinafter, in the drawings, a portion close to an upper side is defined as an upper portion, an upper end, an upper surface, and an upper end portion, and a portion close to a lower side is defined as a lower portion, a lower end, a lower surface, and a lower end portion.

Furthermore, in the following, an end (one/first side or the other/second side) may be defined as either end, and an end portion may be defined as a certain portion (one/first side portion or the other/second side portion) including the end.

The terminal connection structure 100 of the battery according to an embodiment of the present invention is for connecting the positive terminal 3a and the negative terminal 3b of each of the battery modules 3 of the first row 5 with the positive terminal 3a and the negative terminal 3b of each of the battery modules 3 of the second row 7 adjacent to the battery modules 3 of the first row 5.

The terminal connection structure 100 of the battery according to an embodiment of the present invention has a structure capable of preventing acceleration and explosion of fire when thermal runaway of the battery occurs, and increasing energy density of the battery pack 1.

To this end, the terminal connection structure 100 of the battery according to the embodiment of the present invention includes a first bus bar module 10 and a second bus bar module 30 as main components thereof.

Figure 4:
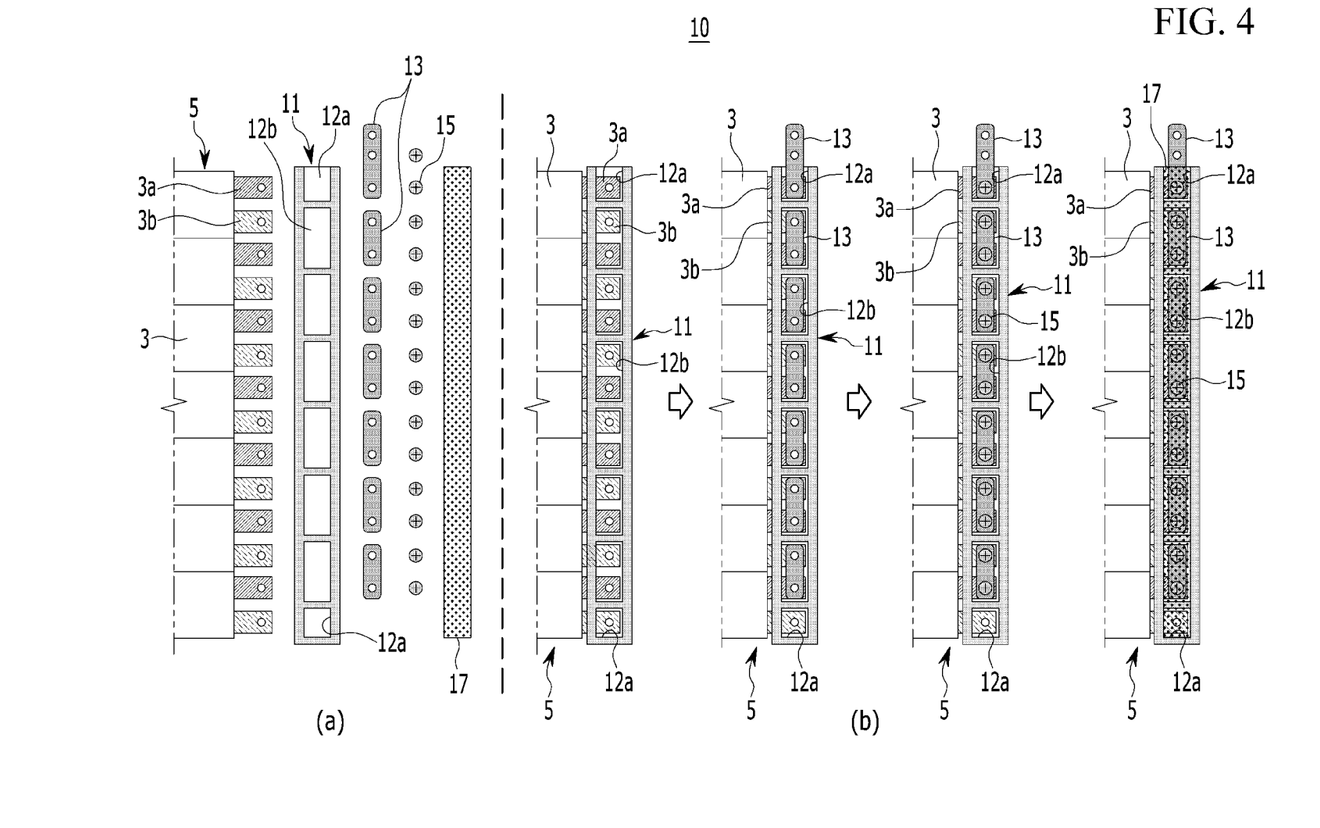
FIG. 4 and FIG. 5 illustrate an exploded diagram showing a terminal connection structure of a battery according to an embodiment of the present invention.
Figure 5:
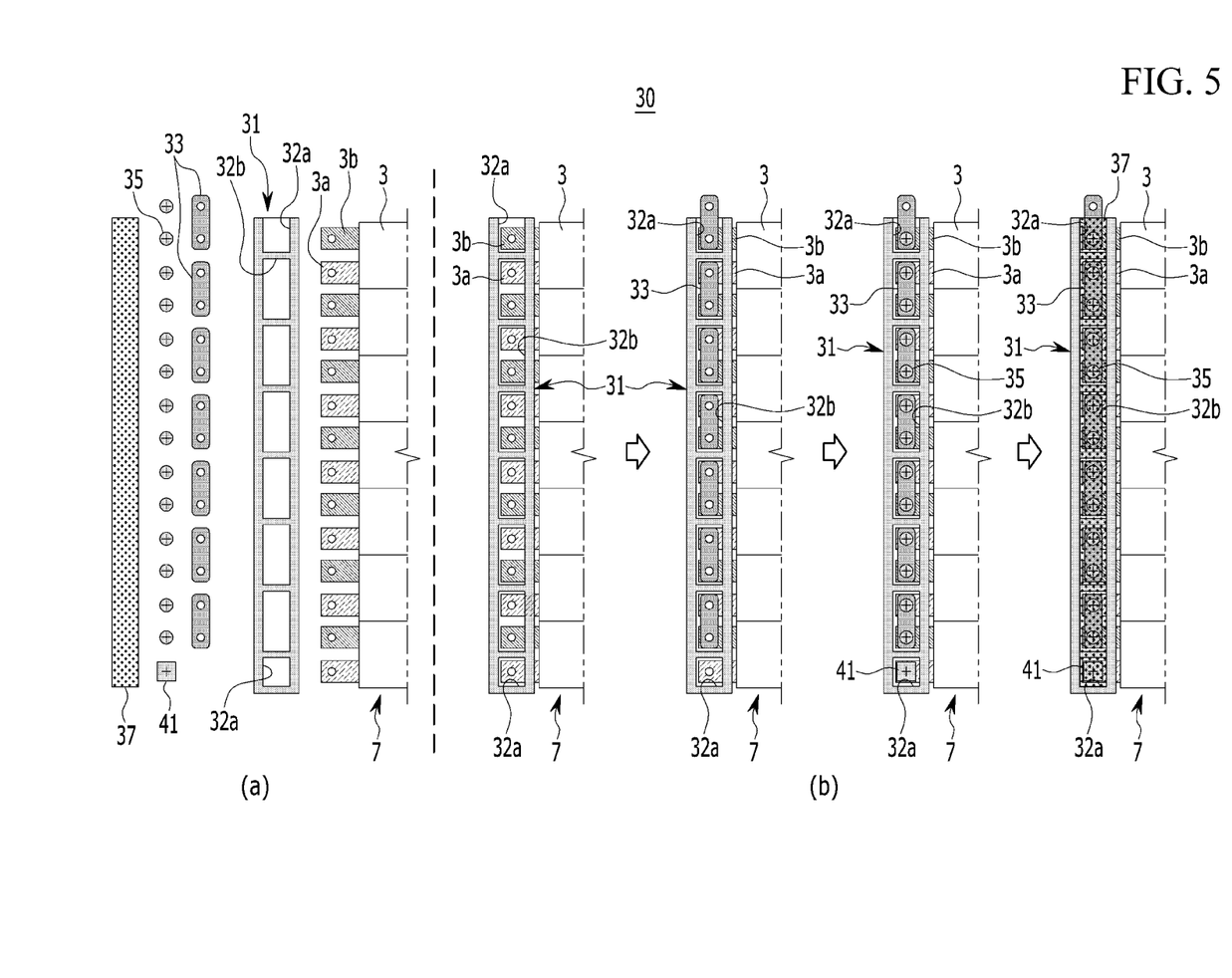

FIG. 4 and FIG. 5 illustrate an exploded diagram showing a terminal connection structure of a battery according to an embodiment of the present invention.

Referring to FIG. 1 to FIG. 5, in an embodiment of the present invention, the first bus bar module 10 is for electrically connecting the positive terminal 3a and the negative terminal 3b in each of the battery modules 3 of the first row 5.

This first bus bar module 10 includes a first terminal block 11, first bus bars 13, a first fastening bolt 15, and a first cover 17.

The first terminal block 11 electrically connects the battery modules 3 of the first row 5 and a power supply unit (not illustrated), and accommodates the positive terminal 3a and negative terminal 3b of each of the battery modules 3 to electrically connect the battery modules 3. Since the power supply unit is well known to those skilled in the art, a further detailed description thereof will be omitted.

The first terminal block 11 is positioned along an arrangement direction of the battery modules 3 in the battery modules 3 of the first row 5. This first terminal block 11 includes a conductor bar (not illustrated) for electrically connecting the battery modules 3 through the positive terminal 3a and the negative terminal 3b; and a terminal block (not illustrated). Since the conductor bar and the terminal block are well known to those skilled in the art, a further detailed description thereof will be omitted.

Herein, the first terminal block 11 has first terminal accommodating portions 12a accommodating the positive terminal 3a and the negative terminal 3b, respectively, at opposite ends in a longitudinal direction. Further, the first terminal block 11 has second terminal accommodating portions 12b for simultaneously accommodating the positive terminal 3a and the negative terminal 3b of the battery modules 3 adjacent to each other in the first row 5, which are formed between opposite ends in the longitudinal direction. Furthermore, the first terminal block 11 opens the first and second terminal accommodating portions 12a and 12b through an upper end thereof, and closes the first and second terminal accommodating portions 12a and 12b through a lower end thereof.

The first bus bars 13 connect the positive terminals 3a and the negative terminals 3b of the battery modules 3 adjacent to each other in the first row 5, and are positioned in the first and second terminal accommodating portions 12a and 12b of the first terminal 11.

The first fastening bolt 15 is for fastening the first bus bars 13, the positive terminal 3a, and the negative terminal 3b to the first terminal block 11. In addition, the first cover 17 is for covering an upper end of the first terminal block 11, and is coupled to the upper end of the first terminal block 11.

In the first bus bar module 10, a heat insulating material 19 is provided on an inner surface of the first terminal block 11 and a lower surface of the first cover 17. The heat insulating material 19 may be provided as a heat insulating plate made of a mica material, for example.

Furthermore, in the first bus bar module 10, the first bus bar 13 connected to the positive terminal 3a protrudes from the first terminal block 11 along the arrangement direction of the battery modules 3 in one first terminal accommodating portion 12a of the first terminal block 11.

In an embodiment of the present invention, the second bus bar module 30 is for electrically connecting the positive terminal 3a and the negative terminal 3b in each of the battery modules 3 of the second row 7 adjacent to the battery modules 3 of the first row 5.

The second bus bar module 30 is vertically stacked on the first bus bar module 10 to which the battery modules 3 of the first row 5 are electrically connected, and is electrically connected to the first bus bar module 10.

This second bus bar module 30 includes a second terminal block 31, second bus bars 33, a second fastening bolt 35, and a second cover 37.

The second terminal block 31 electrically connects the battery modules 3 of the second row 7 and a power supply unit (not illustrated), and accommodates the positive terminal 3a and negative terminal 3b of each of the battery modules 3 to electrically connect the battery modules 3. Since the power supply unit is well known to those skilled in the art, a further detailed description thereof will be omitted.

The second terminal block 31 is positioned along an arrangement direction of the battery modules 3 in the battery modules 3 of the second row 7. This second terminal block 31 includes a conductor bar (not illustrated) for electrically connecting the battery modules 3 through the positive terminal 3a and the negative terminal 3b, and a terminal block (not illustrated). Since the conductor bar and the terminal block are well known to those skilled in the art, a further detailed description thereof will be omitted.

Herein, the second terminal block 31 has first terminal accommodating portions 32a accommodating the positive terminal 3a and the negative terminal 3b, respectively, at opposite ends in a longitudinal direction. Further, the second terminal block 31 has second terminal accommodating portions 32b for simultaneously accommodating the positive terminal 3a and the negative terminal 3b of the battery modules 3 adjacent to each other in the second row 7, which are formed between opposite ends in the longitudinal direction. Furthermore, the second terminal block 31 opens the first and second terminal accommodating portions 32a and 32b through an upper end thereof, and closes the first and second terminal accommodating portions 32a and 32b through a lower end thereof.

The second bus bars 33 connect the positive terminals 3a and the negative terminals 3b of the battery modules 3 adjacent to each other in the second row 7, and are positioned in the first and second terminal accommodating portions 32a and 32b of the first terminal 31.

The second fastening bolt 35 is for fastening the second bus bars 33, the positive terminal 3a, and the negative terminal 3b to second first terminal block 31. In addition, the second cover 37 is for covering an upper end of the second terminal block 31, and is coupled to the upper end of the second terminal block 31.

In the second bus bar module 30, a heat insulating material 39 is provided on an inner surface of the second terminal block 31 and a lower surface of the second cover 37. The heat insulating material 39 may be provided as a heat insulating plate made of a mica material, for example.

Furthermore, in the second bus bar module 30, the second bus bar 33 connected to the negative terminal 3b protrudes from the second terminal block 31 along second arrangement direction of the battery modules 3 in one first terminal accommodating portion 32a of the second terminal block 31.

Herein, the first bus bar 13 protruding from the first terminal block 11 of the first bus bar module 10 and the second bus bar 13 protruding from the second terminal block 31 of the second bus bar module 30 may be electrically connected to each other through a conventional electrical connector.

Further, the first bus bar module 10 and the second bus bar module 30 are stacked in the vertical direction through the first and second terminals 11 and 31 between the battery modules 3 in the first row 5 and the battery modules 3 in the second row 7 adjacent to each other.

Figure 6:
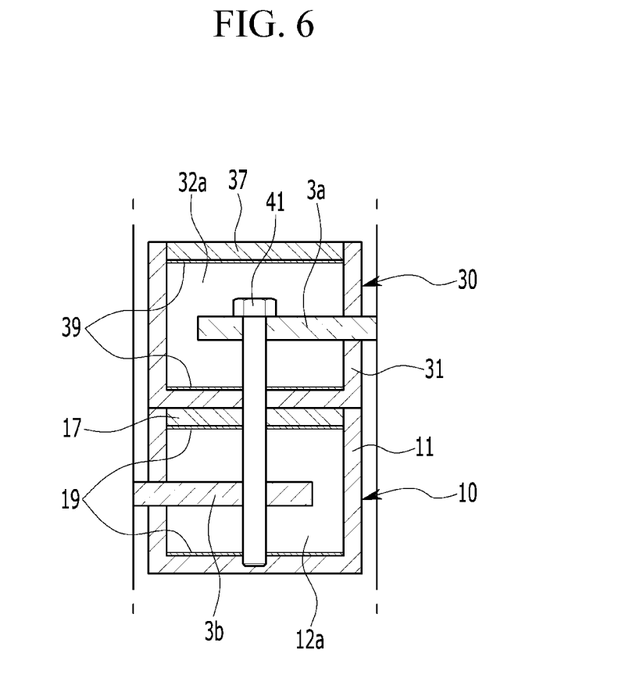
FIG. 6 illustrates a connection structure of a first bus bar module and a second bus bar module applied to a terminal connection structure of a battery according to an embodiment of the present invention.

On the other hand, referring to FIG. 6, in the structure in which the first and second bus bar modules 10 and 30 are stacked in the vertical direction, the negative terminal 3b accommodated in the other first terminal accommodating portion 12a of the first terminal block 11 and the positive terminal 3a accommodated in the other first terminal accommodating portion 32a of the second terminal block 31 may be coupled to each other through a copper bolt 41 to be electrically connected.

For example, in an embodiment of the present invention, in a state in which the second bus bar module 30 is stacked on the first bus bar module 10, before coupling the second cover 37 to the second terminal to 31, the copper bolt 41 may extend through the positive terminal 3a, the first and second terminal blocks 11 and 31, and the negative terminal 3b, and may be fastened to the inner surface of the second terminal block 31.

Accordingly, the first and second bus bar modules 10 and 30 may be stacked in the vertical direction and electrically connected while being fastened in the vertical direction by the copper bolt 41.

Accordingly, in accordance with the terminal connection structure 100 of the battery according to the embodiment of the present invention, a space between the positive terminal 3a and the negative terminal 3b of the battery modules 3 arranged adjacent to each other may be separated through the first and second terminal blocks 11 and 31 of the first and second bus bar modules 10 and 30.

In addition, in an embodiment of the present invention, Insulators 19 and 39 are applied to the first and second terminal blocks 11 and 31 accommodating the positive terminal 3a and the negative terminal 3b of the battery modules 3 arranged adjacent to each other and the first and heat insulating materials 19 and 39.

Accordingly, in an embodiment of the present invention, acceleration and explosion of fire may be prevented when a thermal runaway phenomenon of a battery occurs.

Then, in an embodiment of the present invention, as the first and second bus bar modules 10 and 30 are stacked in the vertical direction between the battery modules 3 of the first row 5 and the battery modules 3 of the second row 7 adjacent to each other, it is possible to increase the energy density of the battery pack 1 by reducing the conventional unused space.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 1: battery pack | 3: battery module |
| 3a: positive terminal | 3b: negative terminal |
| 5: first row | 7: second row |
| 10: first bus bar module | 11: first terminal block |
| 12a, 32a: first terminal accommodating portion | |
| 12b, 32b: second terminal accommodating portion | |
| 13: first bus bar | 15: first fastening bolt |
| 17: first cover | 19, 39: heat insulating material |
| 30: second bus bar module | 31: second terminal block |
| 33: the second bus bar | 35: the second fastening bolt |
| 37: second cover | 41: copper bolt |
| 100: terminal connection structure | |

What is claimed is:

1. A battery pack (1), comprising:
   a first row (5) of battery modules (3) including a plurality of battery modules (3) arranged in a length direction, each battery module (3) including a positive terminal (3a) and a negative terminal (3b);
   a second row (7) of battery modules (3) neighboring the first row (5) of battery module (3) and including a plurality of battery modules (3) arranged in the length direction, each battery module (3) including a positive terminal (3a) and a negative terminal (3b);
   a first bus bar module (10) accommodating and electrically connecting the positive and negative terminals (3a, 3b) in the first row (5) of battery modules (3); and
   a second bus bar module (30) accommodating and electrically connecting the positive and negative terminals (3a, 3b) in the second row (7) of battery modules (3), disposed on the first bus bar module (10), and to be electrically connected to the first bus bar module (10),
   wherein the first bus bar module (10) includes:
   a first terminal block (11) disposed in the length direction of the first row (5) of battery modules (3), and including a first terminal accommodating portion (12a) and at least one second terminal accommodating portion (12b) which are integrally formed in the length direction, wherein the first terminal accommodating portion (12a) accommodates one of the positive and negative terminals (3a, 3b) of the first row (5) of the battery modules (3), and the at least one second terminal accommodating portion (12b) accommodates the neighboring positive and negative terminals (3a, 3b) of the neighboring battery modules (3) in the first row (5) of battery modules (3);
   at least one first bus bar (13) positioned in the first terminal block (11) to connect the neighboring positive and negative terminals (3a, 3b) accommodated in the second terminal accommodating portion (12b);
   a first fastening bolt (15) configured to fasten the first bus bar (13) and the positive terminal (3a) or the negative terminal (3b) to the first terminal block (11); and a first cover (17) configured to cover an upper end of the first terminal block (11).

2. The battery pack (1) of claim 1, wherein the second bus bar module (30) includes:
- a second terminal block (31) disposed in the length direction of the second row (7) of battery modules (3), and including a first terminal accommodating portion (32a) and at least one second terminal accommodating portion (32b) which are integrally formed in the length direction, wherein the first terminal accommodating portion (32a) accommodates one of the positive and negative terminals (3a, 3b) of the second row (7) of battery modules (3), and the at least one second terminal accommodating portion (32b) accommodates the neighboring positive and negative terminals (3a, 3b) of the neighboring battery modules (3) in the second row (7) of battery modules (3), which are formed in the length direction;
- at least one second bus bars (33) positioned in the second terminal block (31) to connect the neighboring positive and negative terminals (3a, 3b) accommodated in the second terminal accommodating portion (32b);
- a second fastening bolt (35) configured to fasten the second bus bars (33) and the positive terminal (3a) or the negative terminals (3b) to the second terminal block (31); and
- a second cover (37) configured to cover an upper end of the second terminal block (31).

3. The battery pack (1) of claim 2, wherein
the first terminal block (11) or the second terminal blocks (31) includes
a pair of first terminal accommodating portions (12a, 32a) at both ends thereof, one of the pair of first accommodating portions (12a, 32a) of the first terminal block (11) or the second terminal block (31) accommodating the positive terminal (3a) and the other of the pair of first accommodating portions (12a, 32a) of the first terminal block (11) or the second terminal block (31) accommodating the negative terminals (3b), and wherein the at least one second terminal (12b, 32b) are formed at the first terminal block (11) or the second terminal block (31) between the pair of first terminal accommodating portions (12a, 32a).

4. The battery pack (1) of claim 3, wherein
one first bus bar (13) connected to the positive terminal (3a) in one of the first terminal accommodating portions (12a) of the first terminal block (11) protrudes from the first terminal block (11) in the length, and
one second bus bar (33) connected to the negative terminal (3b) in one of the first terminal accommodating portions (32a) of the second terminal block (31) protrudes from the second terminal block (31) in the length direction.

5. The battery pack (1) of claim 4, wherein
the negative terminal (3b) accommodated in the other of the first terminal accommodating portions (12a) of the first terminal block (11) and the positive terminal (3a) accommodated in the other of the first terminal accommodating portions (32a) of the second terminal block (31) are coupled to each other through a copper bolt (41) and electrically connected to each other.

6. The battery pack (1) of claim 3, wherein an upper end of each of the first and second terminal accommodating portions (12a, 12b, 32a, 32b) is open and a lower end of the first and second terminal accommodating portions (12a, 12b, 32a, 32b) is closed.

7. The battery pack (1) of claim 3, wherein
an insulating material (19, 39) is provided on an inner surface of each of the first and second terminal blocks (11, 31) and a lower surface of each of the first and second covers (17, 37).

8. The battery pack (1) of claim 2, wherein
the first and second bus bar modules (10, 30) are stacked vertically on each other through the first and second terminal blocks (11, 31).

* * * * *